US008005589B2

(12) United States Patent  (10) Patent No.: US 8,005,589 B2
MacDonald et al.  (45) Date of Patent: Aug. 23, 2011

(54) METHOD AND SYSTEM FOR ADDRESSING IMPROPER TOWING OF A VEHICLE

(75) Inventors: Charles G. MacDonald, Toronto (CA); Raymond S. C. Chokelal, Oshawa (CA); Terry W. Ostan, Whitby (CA)

(73) Assignee: GM Global Technology Operations LLC, Detroit, MI (US)

( * ) Notice: Subject to any disclaimer, the term of this patent is extended or adjusted under 35 U.S.C. 154(b) by 733 days.

(21) Appl. No.: 12/142,931

(22) Filed: Jun. 20, 2008

(65) Prior Publication Data

US 2009/0319121 A1  Dec. 24, 2009

(51) Int. Cl.
*G01M 17/00* (2006.01)
(52) U.S. Cl. .......................................... 701/35; 340/438
(58) Field of Classification Search ................ 701/35; 340/438, 426.24, 426.25, 426.33, 686.1, 340/687
See application file for complete search history.

(56) References Cited

U.S. PATENT DOCUMENTS

| | | | |
|---|---|---|---|
| 5,028,907 A * | 7/1991 | Windeler | ....................... 340/438 |
| 5,522,776 A | 6/1996 | Alvey | |
| 6,095,943 A | 8/2000 | Reuthal | |
| 6,655,710 B2 * | 12/2003 | Lindell et al. | .................. 280/419 |
| 6,699,151 B2 | 3/2004 | Grogg et al. | |
| 6,725,989 B1 | 4/2004 | Krisher et al. | |
| 7,026,919 B2 | 4/2006 | Perlman et al. | |
| 7,744,375 B2 * | 6/2010 | Huang et al. | ..................... 439/35 |
| 7,920,058 B2 * | 4/2011 | Bennie et al. | .................. 340/480 |
| 7,950,751 B2 * | 5/2011 | Offerle et al. | .................. 303/193 |
| 2004/0246116 A1 * | 12/2004 | Polzin | ........................... 340/443 |
| 2006/0033308 A1 * | 2/2006 | Waldbauer et al. | ......... 280/455.1 |
| 2006/0105883 A1 | 5/2006 | Krisher et al. | |
| 2007/0074949 A1 * | 4/2007 | Yoshioka | ................. 192/85 AA |
| 2007/0103280 A1 | 5/2007 | Kanafani | |
| 2008/0252434 A1 * | 10/2008 | Leatherman | ................... 340/438 |
| 2009/0093928 A1 * | 4/2009 | Getman et al. | ................... 701/37 |

FOREIGN PATENT DOCUMENTS

| | | |
|---|---|---|
| DE | 19920803 A1 | 12/2000 |
| DE | 102006007732 A1 | 8/2007 |

OTHER PUBLICATIONS

German Office Action dated Feb. 8, 2010, (5 pages).

* cited by examiner

*Primary Examiner* — Faye M. Fleming
(74) *Attorney, Agent, or Firm* — Lionel D. Anderson; Reising Ethington P.C.

(57) ABSTRACT

A method and system that can be used to address improper towing of a vehicle so that unnecessary damage to the vehicle can be detected, recorded, prevented, avoided, etc. According to an exemplary embodiment, the method uses a vehicle power signal and one or more wheel movement signal(s) to detect instances of improper towing and, if detected, initiates a remedial action. Remedial actions could include, for example, alerting the tow truck operator through a visual and/or audible alarm, sending a wireless warning message to a remote call center, and recording the relevant information for subsequent analysis. In one embodiment, the wheel movement signals are provided by tire pressure monitoring (TPM) sensors already located in the vehicle.

18 Claims, 2 Drawing Sheets

US 8,005,589 B2

METHOD AND SYSTEM FOR ADDRESSING IMPROPER TOWING OF A VEHICLE

TECHNICAL FIELD

The present invention generally relates to the towing of vehicles and, more particularly, to a method and system for addressing instances where a vehicle is towed improperly.

BACKGROUND

Improperly towing a vehicle can cause damage to a variety of vehicle components including those that transmit power from the engine to the wheels, such as components in the driveline. This is particularly true with all wheel drive (AWD) systems, however, vehicles having four wheel drive (4WD) systems, front wheel drive (FWD) systems, and rear wheel drive (RWD) systems can also be damaged from improper towing conditions.

As an example, if a tow truck engages a vehicle having an AWD system in a two-wheel tow (i.e., a towing technique where two of the vehicle's wheels are elevated and not rotating, while the other two are on the road surface and are rotating according to the speed of the tow vehicle; see FIG. 1), a clutch or other mechanism in the AWD system can overheat and become damaged. As is appreciated by those skilled in the art, this damage may be caused by a speed differential that exists across friction and reaction plates of the clutch, for example. Depending on the severity and nature of the damage, the clutch can experience undesirable changes to the friction coefficients of certain parts and/or physical deformation of the parts. Of course, these are only some of the possibilities, as other undesirable results can also occur from improper towing.

SUMMARY OF THE INVENTION

According to one aspect, there is provided a method for addressing improper towing of a vehicle. The method comprises the steps of: (a) receiving a vehicle power signal; (b) receiving a wheel movement signal; (c) utilizing the vehicle power signal and the wheel movement signal to determine if the vehicle is being improperly towed; and (d) if the vehicle is being improperly towed, then responding with a remedial action.

According to another aspect, there is provided a system for addressing improper towing of a vehicle. The system comprises: a tire pressure monitoring (TPM) sensor, a first electronic module, and a second electronic module. During a power-mode off condition, movement of a wheel causes: i) the TPM sensor to send a wheel movement signal to the first electronic module, ii) the first electronic module to wake up the second electronic module, iii) the second electronic module to determine if the vehicle is being improperly towed, and iv) the second electronic module to initiate a remedial action if the vehicle is being improperly towed.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The method and system described herein can be used to address improper towing of a vehicle so that unnecessary damage to the vehicle can be detected, recorded, prevented, and/or avoided, etc. The present method can detect instances of improper towing and, depending on the particular embodiment, may take one or more remedial actions. It should be appreciated that while the following description is provided in the context of an exemplary vehicle having an electronically-controlled AWD system, the present method and system could alternatively be used with a number of different systems, including non-electronically controlled AWD systems, 4WD systems, FWD systems, and RWD systems, to name but a few.

Figure 1:
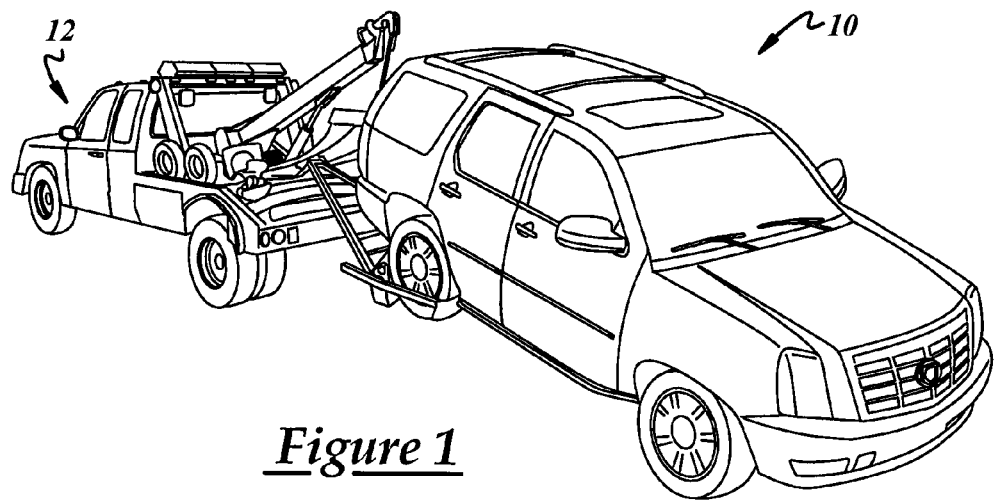
FIG. 1 is a perspective view of an exemplary vehicle being towed according to a two-wheel tow technique.

With reference to FIG. 1, there is shown a perspective view of an exemplary vehicle 10 being towed behind a tow truck 12 according to a two-wheel towing technique. In the case where vehicle 10 is a RWD vehicle, the two-wheel towing technique shown in FIG. 1 may be appropriate because the drive wheels (rear wheels) are elevated and the free spinning wheels (front wheels) are on the road. If, however, the exemplary vehicle 10 is a FWD, AWD or 4WD vehicle, then the two-wheel towing technique shown here may be improper. "Improper towing" broadly refers to any towing technique or towing event that can cause damage to the vehicle being towed; this includes, but is not limited to, damage to components that transmit power from the engine to the wheels, such as the driveline components.

Figure 2:
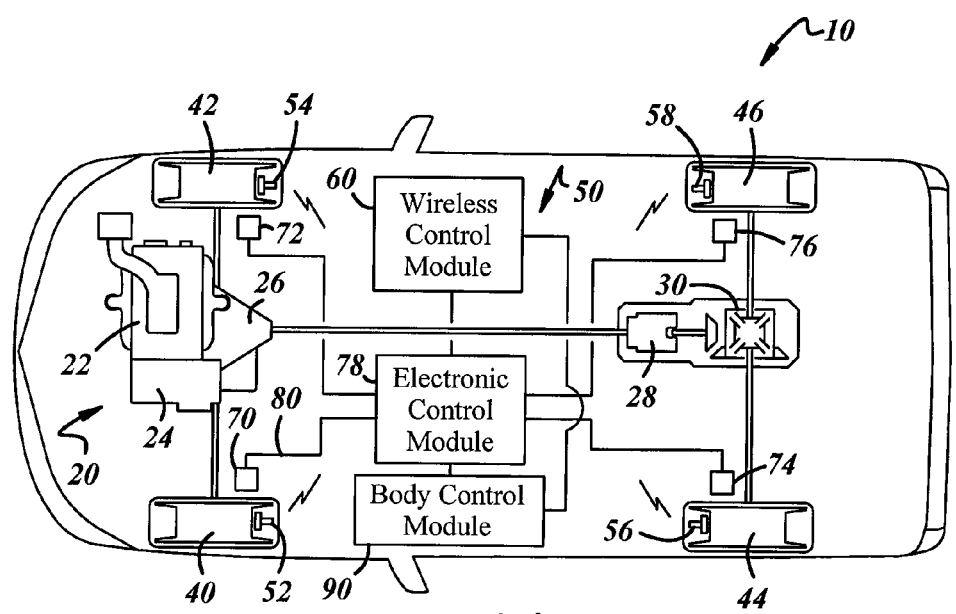
FIG. 2 is a top schematic view of an exemplary vehicle that may utilize the system and method described herein.

Turning now to FIG. 2, there is shown a top schematic view of exemplary vehicle 10 having an electronically-controlled AWD system 20. According to this exemplary embodiment, AWD system 20 is coupled to engine 22 and includes a transaxle 24, a transfer case 26, a coupling unit 28, and a rear differential 30. The AWD system can transfer engine output from engine 22 to front wheels 40, 42 and/or and rear wheels 44, 46 on a full time basis according to techniques known in the art. It should be appreciated that AWD system 20 is simply an exemplary arrangement and that the present system and method could be used with arrangements other than the exemplary one shown and described here; this includes other AWD systems, as well as non-AWD systems.

Engine 22 can be an internal combustion engine, such as those running on gasoline or diesel fuel, and is coupled to transaxle 24. According to this particular embodiment, transaxle 24 combines a transmission and a front differential so that power from the engine can be provided to front wheels 40, 42 under normal, non-slip conditions. Transfer case 26, sometimes called a power take-off unit (PTU), receives output from transaxle 24 and includes gearing to properly distribute driving power to the front and rear wheels. Coupling unit 28, also called a rear drive module (RDM), couples driving power from transfer case 26 to rear differential 30 and can be one of a number of different types, including an electronically-controlled coupling unit or a viscous coupling unit, to cite two examples. It should be appreciated that driveline components, such as those described above, are widely known and understood in the art; thus, a complete recitation of their structure and function has been omitted here.

Vehicle 10 may also include a tire pressure monitoring (TPM) system 50, such as those sometimes mandated by government regulations, vehicle manufacturer specifications, and/or other requirements. In the exemplary embodiment shown here, TPM system 50 monitors both air pressure and inertial movements at each of the vehicle's four wheels by using battery-powered sensors 52-58 that communicate with a wireless control module 60 mounted in the vehicle. Exemplary sensors 52-58 are respectively mounted in wheels 40-46 and may be of the type that are in direct communication with the air inside of the tires (so-called direct TPM system), or of the type that do not directly sense the air pressure within the tire but determine it based on one or more additional parameters, like wheel rotational speed (so-called indirect TPM system). In the case of a direct TPM system, examples of suitable mounting configurations include mounting sensors 52-58 in the end of valve stems or mounting them in steel bands that extend around rims in the wheels, to name but a few.

Skilled artisans will appreciate that some TPM systems can also take readings that pertain to wheel movement; for example, sensors 52-58 may be used to determine the rotational position, velocity, and/or acceleration for each of the respective wheels. These types of 'wheel movement' measurements could be taken in lieu of or in addition to the air pressure readings mentioned above. After taking tire pressure and/or wheel movement readings, sensors 52-58 can send this data to wireless control module 60 via a low-power radio frequency (RF) link or according to some other wireless communication technology known in the art. The data transmissions from sensors 52-58 can be provided on a periodic basis (e.g., every second), on an event-driven basis (e.g., when the sensor determines that the air pressure is outside of a predetermined range), or according to some other suitable basis. In one example, wireless control module 60 is a remote function actuator (RFA), such as the type oftentimes used with key fobs and vehicle theft deterrent (VTD) systems. This wireless communication link could be a one-way link where data is sent from sensors 52-58 to control module 60 or a two-way link where information is exchanged therebetween, to cite two examples.

In another embodiment, vehicle 10 includes wheel speed sensors 70-76 that are respectively coupled to wheels 40-46 and are in communication with an electronic control module 78, for example an electronic brake control module (EBCM). Wheel speed sensors 70-76 may be stationary sensors that are located on the vehicle and near the wheels in order to take rotational position, velocity, and/or acceleration readings; examples of such sensors can be found in anti-lock braking systems (ABS), electronic stability control (ESC) systems, or other systems of the vehicle. In the particular embodiment shown here, wheel speed sensors 70-76 are coupled to electronic brake control module (EBCM) 78 via a wired connection 80, such as a communications bus or the like. It should be understood, however, that any suitable connection, including both wired and wireless connections, could be used. Although the preceding example is directed to wheel speed sensors that are part of a specific vehicle system (e.g., an ABS, ESC system, etc.), the wheel speed sensors could include any device that is used to sense the rotational position, velocity, acceleration, and/or other movement in a vehicle wheel, and are not limited to a specific sensor type or vehicle system.

Vehicle 10 could be designed so that wireless control module 60 and/or electronic control module 78 communicate with a vehicle system module 90, such as a body control module (BCM). The BCM can provide vehicle occupants with various visual and audible information and is linked to numerous components and systems throughout the vehicle, including the exemplary RFA 60 and EBCM 78. BCM 90 may be connected to RFA 60, EBCM 78 and other devices via a wired and/or wireless communications network, such as those commonly found in vehicles. Generally, the vehicle must be on (i.e., a power-mode on condition) in order for the BCM to be operational. There are instances when the BCM can be woken up without powering up the vehicle, but it is typically the case that the BCM is off when the vehicle is in a power-mode off condition. Some examples of possible BCM functions include operating: power door locks, visual warnings, audible warnings, headlights, vehicle theft deterrent (VTD) systems, illuminated entries, and driver information centers (DICs), to list a few examples. Of course, it is possible for wireless control module 60 and electronic control module 78 to be coupled to and communicate with a module or system other than the BCM, as the BCM is only one example.

Figure 3:
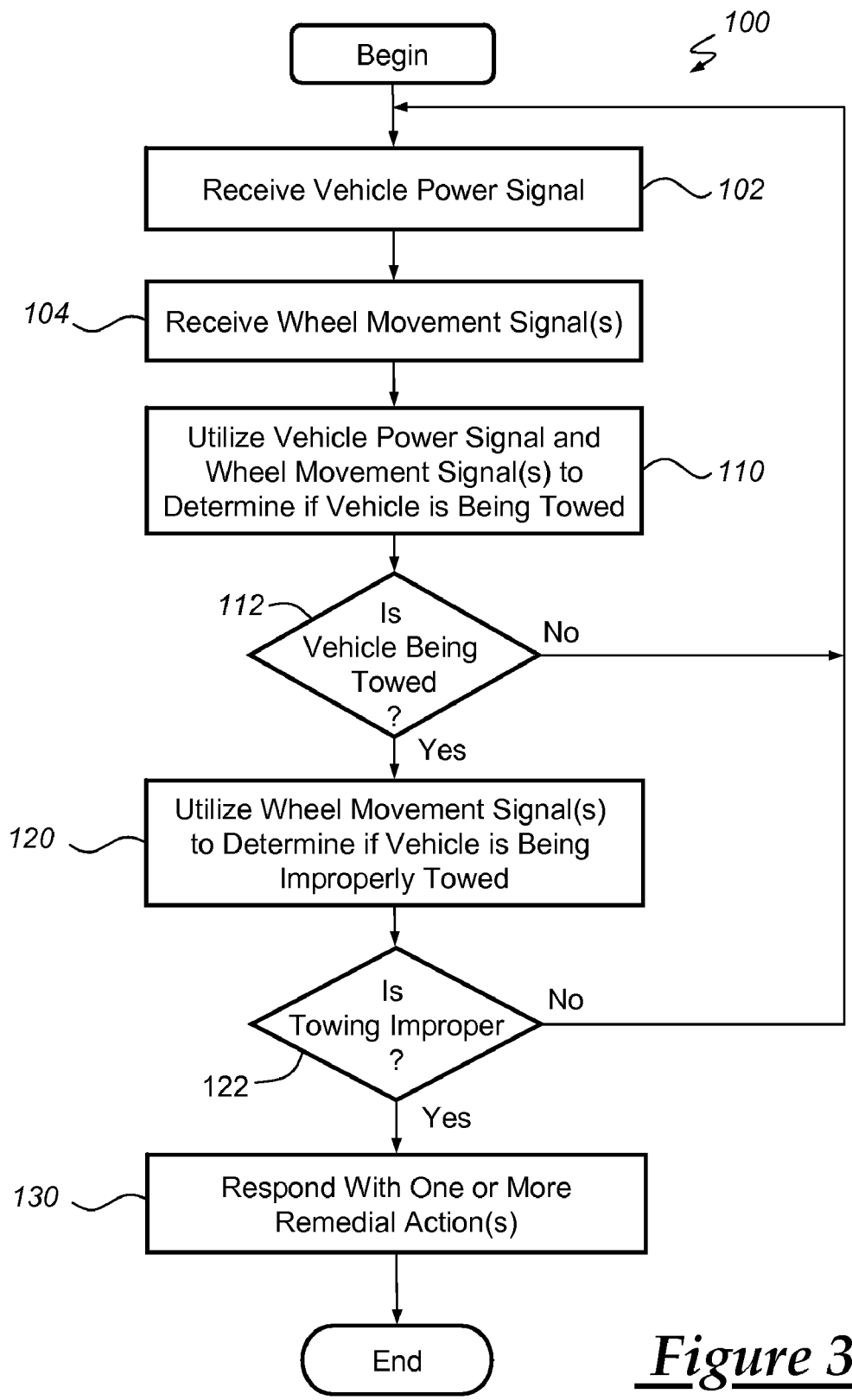
FIG. 3 is a flowchart illustrating some of the steps of an exemplary method for addressing improper towing of a vehicle, and this method may be used with the exemplary vehicle shown in FIG. 2.

FIG. 3 is a flowchart showing some of the steps of an exemplary method 100 that can address or treat improper towing of a vehicle. Beginning with step 102, the method receives a vehicle power signal that is representative of the power status of the vehicle. A 'vehicle power signal' broadly includes any signal, message, or other information that indicates the power status of the vehicle, and it can originate from a number of different sources. In an exemplary embodiment, the vehicle power signal is provided by BCM 90 over a vehicle communications network and it indicates whether or not the vehicle is turned 'off' (a power-mode off condition where most if not all electronic modules are powering down to a sleep mode, in a lower power usage mode, or are in a sleep mode), is turned 'on' (a power-mode on or run condition where most if not all electronic modules are either powering up or are in a fully powered mode), or if the key is turned to some accessories-mode position, to cite a few possibilities. In some vehicles, the BCM periodically sends a vehicle power signal out over the vehicle communications network; in these vehicles, the present method could use the signal already being provided. It should be appreciated that the vehicle power signal could be received from sources other than BCM 90, it could be received by passively listening for it or by actively obtaining it, or it could be received in some other way known in the art.

Next, step 104 receives one or more wheel movement signals that are representative of movement in a wheel. A 'wheel movement signal' broadly includes any signal, message, or other information that indicates movement in a wheel of the vehicle, and it can originate from a number of different sources, including the different sensors described above. A wheel movement signal can simply indicate whether or not a wheel is moving (i.e., a yes/no condition), it can indicate whether or not a wheel is moving at a rotational velocity or frequency that is greater than a certain threshold (again, a yes/no condition), or it can indicate the absolute rotational velocity of the wheel, to name but a few of the possibilities.

In an exemplary embodiment, wheel movement signals are wirelessly sent from TPM sensors 52-58 located at each of the vehicle wheels to RFA 60. A wheel movement signal may be sent when the rotational speed of the wheel exceeds a predetermined threshold (e.g., a rotational speed that equals a vehicle speed of approximately 40 km/h). In an event-driven setup like this, each TPM sensor 52-58 can monitor wheel movement and/or tire pressure readings at its respective wheel. If the readings are outside of some acceptable range, then the TPM sensor can convey this information to RFA 60 or some other device over a wireless link. TPM sensors 52-58 may transmit this information on an individual sensor basis, or according to some type of coordinated basis that involves multiple sensors, for example. In instances where TPM sensors are mandated by government regulations, they would already exist on the vehicle so that their usage here does not present a significant additional cost.

The use of TPM sensors may be advantageous for power consumption reasons. Stated differently, it is possible to monitor for wheel movement with the TPM sensors while the vehicle is in a power-mode off condition; a condition where the majority of the vehicle's electronic modules are turned off. If a TPM sensor 52-58 detects sufficient wheel movement, then it may send a wireless signal to RFA 60 which, in turn, wakes up other appropriate devices, like BCM 90. Thus, usage of TPM sensors 52-58 during this monitoring phase could preserve power because the more significant power-consuming devices, like BCM 90, are only woken up once wheel movement is detected. It should be appreciated that RFA 60 could automatically wake up BCM 90 when it receives a wheel movement signal from the TPM sensors (i.e., a dumb wakeup), or it could perform processing steps first to make sure that an actual wheel movement has occurred (i.e., a smart wakeup), to provide a couple of possibilities. An example of a smart wakeup procedure by RFA 60 could include requiring wheel movement for a certain number of wheel revolutions, for a certain amount of time, or some other criteria, before waking up the BCM. Of course, wheel movement signals could be obtained in ways other than the preceding examples.

For instance, instead of using TPM sensors, step 104 could receive wheel movement signals from one or more wheel speed sensors 70-76. Depending on the particular embodiment, wheel speed sensors 70-76 may need to be woken up before they can provide wheel movement signals. Consider the example where the vehicle is in a power-mode off condition and wheel speed sensors 70-76 are associated with EBCM 78. In order for wheel speed sensors 70-76 to work, the EBCM may need to be powered up first. Thus, step 104 could look for a wakeup event that is suggestive of vehicle towing before powering up the EBCM, which in turn could activate the wheel speed sensors so that they could begin checking for wheel movement. A variety of wakeup events could be used for this purpose.

For example, tow truck operators oftentimes insert the vehicle's key into the ignition and temporarily place the vehicle in an accessory-mode on condition before towing. This enables them to straighten up the steering wheel or perform other towing preparations. This temporary accessory mode activation could act as a wakeup event because it suggests that the vehicle is about to be towed. In response to this wakeup event, BCM 90, EBCM 78, and/or other devices could be powered up so that wheel speed sensors 70-76 can monitor for wheel movement. The powering or activation of these modules may be on a temporary basis (e.g., a timer could be initiated following the wakeup event and, if at the expiration of that timer the wheels had not moved, then the aforementioned modules could be turned off). Of course, temporary accessory-mode activation is only one possible wakeup event. Any event, condition, occurrence, sensor reading, etc. that indicates the vehicle may be towed could be used as a wakeup event. In another example, the wakeup event involves a diagnostic trouble code (DTC) that indicates the vehicle has been damaged or disabled. If a DTC is generated that indicates the vehicle has experienced some type of failure that prevents it from being driven, then it can be assumed that the vehicle will have to be towed. It should be appreciated that other wake events could also be used.

Turning back to FIG. 3, step 110 utilizes the vehicle power signal from step 102 and the wheel movement signal(s) from step 104 to determine if the vehicle is being towed. If the vehicle is in a power-mode off condition and one or more of the vehicle's wheels are rotating, then step 110 can assume that the vehicle is being towed. This determination may be made by RFA 60, EBCM 78, BCM 90 or some other suitable module, device, unit, etc. in the vehicle. In the exemplary embodiments mentioned above, TPM sensors 52-58 and/or wheel speed sensors 70-76 provide wheel movement signals that are representative of the rotational state of the wheels. If the vehicle is in a power-mode off condition and the wheel movement signals indicate that one or more of the vehicle's wheels are rotating, then step 110 may determine that the vehicle is being towed; in this case step 112 advances control of the method to step 120 to determine if the towing is proper or improper. If the vehicle is in a power-mode on condition or if the method fails to receive any wheel movement signals suggesting wheel rotation, then step 110 may determine that the vehicle is not being towed. In this case, step 112 sends control of the method back to step 102 so that signal monitoring can resume.

Step 120 utilizes the wheel movement signal(s), plus any other suitable information, to determine if vehicle 10 is being improperly towed. According to an exemplary embodiment, step 120 uses wheel movement signals from the various sensors to determine which wheels are rotating and how fast they are rotating relative to one another; this can be accomplished in a variety of ways. For example, if TPM sensors 52-58 directly provide rotational velocity information, then RFA 60 could provide this information to BCM 90 so that the rotational velocities of each of the wheels is known. If, on the other hand, TPM sensors 52-58 only provide limited inertial information on the wheels plus tire pressure readings, it is possible for EBCM 78, BCM 90, or some other device to calculate the rotational velocity of the tires based on this information. In the example where EBCM 78 has been woken up, rotational velocity information for each of the wheels can be directly obtained from wheel speed sensors 70-76. Again, these are only some examples, as other approaches could also be used.

If the vehicle is in a power-mode off condition and the front wheels 40, 42 are rotating while the rear wheels 44, 46 are stationary, it can be assumed that the vehicle is undergoing a two-wheel tow, such as that shown in FIG. 1. Step 120 could then compare this to information regarding the vehicle's driveline. If, for example, the vehicle is an AWD, 4WD or FWD vehicle, then step 120 may determine that the vehicle is being improperly towed; if it is a RWD vehicle, then this two-wheel towing may be appropriate and proper. The same type of analysis could be used for two-wheel towing situations where the vehicle's rear wheels are on the ground. If all four wheels are rotating, then step 120 could query BCM 90 or some other device to determine if the transmission is in a neutral setting. If the transmission is in any setting other than neutral, then step 120 may determine that the vehicle is being improperly towed. It should be appreciated that a number of different techniques could be employed by step 120 to detect an improper tow, and it is not limited to the exemplary techniques described here.

If the vehicle is not being improperly towed, then step 122 sends control of the method back to step 102 so that further signal monitoring can continue. If step 122 detects an improper towing condition, then the method is advanced to step 130 so that it can respond with one or more remedial action(s). A 'remedial action' broadly includes any action or response that can be taken to record, prevent, avoid, and/or otherwise address improper towing. For instance, a remedial action could include activating a visual and/or audible alarm to warn the tow truck operator of the improper towing conditions. This could include BCM 90 or some other device engaging the vehicle's horn, headlights, emergency flashers, vehicle theft deterrent (VTD) system, etc. so that they can be perceived by the tow truck operator.

A remedial action could also include sending a message from the vehicle to a remote facility over a wireless communications link alerting it of the improper towing conditions. For example, BCM 90 could instruct a vehicle telematics unit or the like to send a warning message to a remote call center, the owner of the vehicle, or some other entity (previously established emergency phone numbers and other contact information could be used). The warning message could include data relating to the improper towing event; data such as the date and time the vehicle was improperly towed, the duration of time the vehicle was improperly towed, the speed at which the vehicle was improperly towed, the distance the vehicle was improperly towed, and/or any other information that could be useful for gauging the severity or magnitude of potential damage to the vehicle. The recipient of this information could record the data, determine which service station the vehicle was being taken to and inform them of the potential damage to the vehicle, or make an attempt to contact the tow truck operator and request that they stop towing the vehicle improperly. In this example, alerting the service station or vehicle owner could be helpful for troubleshooting and preventative maintenance purposes, even if the remedial action was unable to stop the improper tow.

In another example, a remedial action could involve electronically storing the pertinent information and data for subsequent analysis. As an example, if wheel speed sensors 70-76 provide EBCM 78 with accumulated wheel speeds, this information could be stored and later processed to determine if any damage likely occurred. If it is determined that vehicle 10 likely incurred damage due to the improper tow, a diagnostic trouble code (DTC), message, or other piece of information could be generated and/or sent to a driver information center (DIC) to document this potential damage. These are, of course, only some exemplary remedial actions, as other actions and responses may also be used. Any combination of the above-listed exemplary remedial actions may also be used.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, a method having greater, fewer, or different steps than those shown in the exemplary method of FIG. 3 could be used instead. It is also possible to use the method and/or system described above to address instances, other than improper towing, where wheel speed differentials could damage the driveline components; some examples include situations where the vehicle is mounted on a dynamometer, or where the vehicle is being driven with a significantly smaller spare tire, to name a few. All such embodiments, changes, and modifications are intended to come within the scope of the appended claims.

As used in this specification and claims, the terms "for example," "for instance," "e.g.," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. Method for addressing improper towing of a vehicle, comprising the steps of:
    a) receiving a vehicle power signal that is representative of the power status of the vehicle;
    b) receiving a wheel movement signal that is representative of movement in a wheel of the vehicle;
    c) utilizing the vehicle power signal and the wheel movement signal to determine if the vehicle is being improperly towed; and
    d) if the vehicle is being improperly towed, then responding with a remedial action.

2. The method of claim 1, wherein step (a) further comprises receiving the vehicle power signal from a body control module (BCM) over a vehicle communications network.

3. The method of claim 1, wherein step (b) further comprises receiving the wheel movement signal from a tire pressure monitoring (TPM) sensor located at the wheel of the vehicle.

4. The method of claim 3, wherein the wheel movement signal is sent from the TPM sensor located at the wheel of the vehicle to a remote function actuator (RFA) located elsewhere in the vehicle over a wireless link.

5. The method of claim 4, wherein the remote function actuator (RFA) wakes up a body control module (BCM) in response to receiving the wheel movement signal.

6. The method of claim 1, wherein step (b) further comprises receiving the wheel movement signal from a wheel speed sensor that is located near the wheel of the vehicle.

7. The method of claim 6, wherein wheel movement signal is sent from the wheel speed sensor located near the wheel of the vehicle to an electronic brake control module (EBCM), and the wheel speed sensor and the electronic brake control module (EBCM) are powered up following the occurrence of a wakeup event.

8. The method of claim 7, wherein the wakeup event includes at least one event selected from the list consisting of: detecting a temporary accessory mode activation and detecting a diagnostic trouble code (DTC).

9. The method of claim 1, wherein step (b) further comprises receiving a wheel movement signal from each wheel of the vehicle, and step (c) further comprises utilizing the vehicle power signal and the wheel movement signals from each wheel of the vehicle to determine relative differences in rotational velocities and utilizing the relative differences in rotational velocities to determine if the vehicle is being improperly towed.

10. The method of claim 1, wherein step (d) further comprises responding with one or more remedial action(s) that includes activating an alarm that can be perceived by a tow truck operator.

11. The method of claim 1, wherein step (d) further comprises responding with one or more remedial action(s) that includes sending a warning message from a telematics unit to a remote facility over a wireless communications link.

12. The method of claim 1, wherein step (d) further comprises responding with one or more remedial action(s) that includes electronically storing the wheel movement signal(s) for subsequent analysis.

13. System for addressing improper towing of a vehicle, comprising:

a tire pressure monitoring (TPM) sensor that is coupled to a wheel of the vehicle and provides a wheel movement signal that is representative of movement of the wheel;

a first electronic module that receives the wheel movement signal from the TPM sensor and is usually powered up when the vehicle is in a power-mode off condition; and a second electronic module that is coupled to the first electronic module and is usually powered down when the vehicle is in a power-mode off condition;

wherein during a power-mode off condition, movement of the wheel causes: i) the TPM sensor to send the wheel movement signal to the first electronic module, ii) the first electronic module to wake up the second electronic module, iii) the second electronic module to utilize the wheel movement signal and the power-mode off condition to determine if the vehicle is being improperly towed, and iv) the second electronic module to initiate a remedial action if the vehicle is being improperly towed.

14. The system of claim 13, wherein the first electronic module is a remote function actuator (RFA) and the wheel movement signal is sent from the TPM sensor to the RFA over a wireless link.

15. The system of claim 13, wherein the second electronic module is a body control module (BCM).

16. The system of claim 13, further including a plurality of TPM sensors coupled to a plurality of wheels, wherein the second control module utilizes wheel movement signals from the plurality of TPM sensors to determine relative differences in rotational velocities of the plurality of wheels, and utilizes the relative differences in rotational velocities to determine if the vehicle is being improperly towed.

17. The system of claim 13, further including an alarm that can be perceived by a tow truck operator, wherein the remedial action includes activating the alarm.

18. The system of claim 13, further including a telematics unit, wherein the remedial action includes sending a warning message from the telematics unit to a remote facility over a wireless communications link.

* * * * *